UNITED STATES PATENT OFFICE.

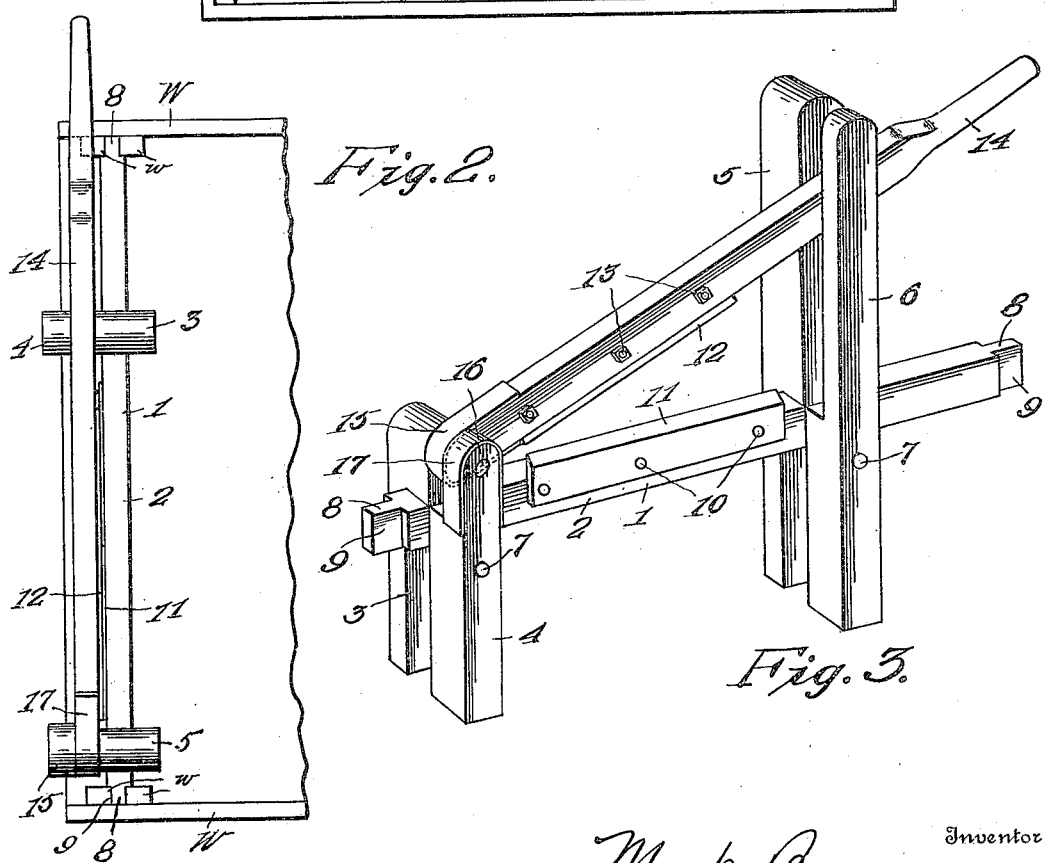

MARK BROWN, OF WATONGA, OKLAHOMA.

KAFIR-CORN HEADER.

934,656. Specification of Letters Patent. Patented Sept. 21, 1909.

Application filed April 1, 1909. Serial No. 487,326.

*To all whom it may concern:*

Be it known that I, MARK BROWN, a citizen of the United States, residing at Watonga, in the county of Blaine and State of Oklahoma, have invented certain new and useful Improvements in Kafir-Corn Headers, of which the following is a specification, reference being had to the accompanying drawings.

This invention is a Kafir corn header for use on an ordinary farm wagon in place of its usual tail gate.

The object of the invention is to provide a simple and practical cutting device by means of which the heads or tops of bundles of Kafir corn may be cut from the stalks and which may be readily applied to or removed from an ordinary farm wagon by arranging it in the usual cleats provided for the tail gate or end board of the wagon.

With the above and other objects in view, the invention consists of the novel features of construction and the combination and arrangement of parts hereinafter fully described and claimed, and illustrated in the accompanying drawings, in which—

Figure 1 is an end elevation of a wagon box or body showing the invention applied thereto; Fig. 2 is a top plan view of the same; and Fig. 3 is a perspective view of the device removed from the wagon.

In the drawings W denotes a wagon body or box of ordinary construction having secured to its side walls spaced guide cleats *w* for the usual end board or tail gate.

The invention comprises a frame 1 detachably or removably mounted on the wagon body W by providing it with means to enter between the guide cleats *w*. Said frame 1 consists of a horizontal bar 2 which has secured to its opposite side faces adjacent to one end, uprights 3, 4 and to said side faces at a suitable distance from its other end uprights 5, 6. Said uprights 3, 4 and 5, 6 form the frame and they are held together and united to the horizontal bar 2 by means of transverse bolts 7. The projecting ends of the horizontal bar 2 are reduced, as shown at 8, to form tongues 9 which enter between the upright guide cleats *w*, as clearly shown in Fig. 2 of the drawings. The intermediate portion of the horizontal bar 2 has upon one of its sides a recess in which is secured by bolts 10 a stationary cutting blade 11. The latter co-acts with a movable cutting blade 12 similarly secured at 13 to the intermediate portion of a hand lever 14. Said lever has one of its ends reinforced by a metal strap 15 and is pivoted by a bolt 16 between the projecting upper ends of the uprights or standards 3, 4, the upright 4 having its upper portion recessed to receive said lever and the upright 3 having at its top a projection which overhangs the horizontal bar 2, as clearly shown in Fig. 3 of the drawings. To reinforce the reduced upper end of the upright 4 at its pivot where there is strain, I preferably provide a metal strap 17, as shown. The free end of the lever 14 is shaped to provide a handle and said lever is guided in its swinging movement by making the uprights 5, 6 of greater height than the uprights 3, 4 and by recessing the projecting upper portion of the upright 6 for the reception of the lever and providing said upper portion of the upright 5 with an enlargement which overlies the horizontal bar 2.

In using the invention, the tail gate of the wagon is removed from its body or box and the frame 1 is placed in position at the end of the wagon with the tongues 9 projecting between the cleats *w* and with the lower ends of the four uprights 3, 4, 5, 6 resting upon the floor or bottom of the wagon body. One operator stands in one corner of the wagon and operates the lever 14 while another operator lifts the bundles of Kafir corn and places their heads or tops upon the stationary blade 11 so that when the blade 12 swings downwardly the corn will be headed or topped and the cut portions will drop into the wagon.

It will be seen that the invention is an exceedingly simple and practical device of this character which will be very effective for the purpose intended and which may be produced at a small cost and readily applied to or removed from an ordinary farm wagon.

Having thus described the invention what is claimed is:

The combination with a wagon body having spaced guide cleats for its tail gate, of a cutting frame consisting of a horizontal bar and pairs of uprights secured on opposite sides of the same adjacent its ends, the upper ends of one pair of uprights being extended to provide guides, a lever fulcrumed at one end between the upper ends of the other pair of uprights and adapted to swing between said guides, a cutting blade carried by said lever, and a co-acting cutting blade carried by said horizontal bar, the projecting ends of said horizontal bar being reduced to provide tongues to enter between the spaced guide cleats of the wagon body, whereby the cutting frame will be removably supported with its uprights resting upon the bottom of the wagon body.

In testimony whereof I hereunto affix my signature in the presence of two witnesses.

MARK BROWN.

Witnesses:
   E. L. GRIFFIN,
   W. B. PIPER.